US006853173B2

United States Patent
Caine et al.

(10) Patent No.: US 6,853,173 B2
(45) Date of Patent: Feb. 8, 2005

(54) PROGRAMMABLE DUAL MODE HYSTERETIC POWER OUTPUT CONTROLLER

(75) Inventors: Steven Lance Caine, Destin, FL (US); Charles Garrison Wier, Suwanee, GA (US); William Alva Dunn, Norcross, GA (US)

(73) Assignee: Broadcom Corporation, Irvine, CA (US)

( * ) Notice: Subject to any disclaimer, the term of this patent is extended or adjusted under 35 U.S.C. 154(b) by 58 days.

(21) Appl. No.: 10/244,407

(22) Filed: Sep. 17, 2002

(65) Prior Publication Data

US 2003/0141858 A1 Jul. 31, 2003

Related U.S. Application Data

(60) Provisional application No. 60/350,896, filed on Jan. 25, 2002.

(51) Int. Cl.[7] ................................................. G05F 1/56
(52) U.S. Cl. ........................................ 323/285; 323/283
(58) Field of Search .................................. 323/282, 283, 323/284, 286, 288, 285, 222, 234; 363/16, 34, 37, 39, 87, 86, 89, 44, 84

(56) References Cited

U.S. PATENT DOCUMENTS

| | | | | |
|---|---|---|---|---|
| 3,908,163 A | * | 9/1975 | Gilmore | 323/257 |
| 4,066,977 A | * | 1/1978 | Chambers et al. | 330/129 |
| 5,945,820 A | * | 8/1999 | Namgoong et al. | 323/282 |
| 6,198,261 B1 | * | 3/2001 | Schultz et al. | 323/272 |
| 6,275,018 B1 | * | 8/2001 | Telefus et al. | 323/282 |
| 6,404,473 B1 | * | 6/2002 | Kaneko et al. | 349/139 |
| 6,590,369 B2 | * | 7/2003 | Burstein et al. | 323/272 |

* cited by examiner

*Primary Examiner*—Rajnikant B. Patel
(74) *Attorney, Agent, or Firm*—Sterne, Kessler, Goldstein & Fox, PLLC

(57) ABSTRACT

A power output controller includes an output stage, a sensing circuit that compares an output voltage of the output stage with a reference voltage, and a digital controller that controls output pulses that charge the output stage with a frequency that is dependent on an output of the sensing circuit.

40 Claims, 6 Drawing Sheets

US 6,853,173 B2

PROGRAMMABLE DUAL MODE HYSTERETIC POWER OUTPUT CONTROLLER

CROSS-REFERENCE TO RELATED APPLICATIONS

This application claims priority to U.S. Provisional Patent Application No. 60/350,896, filed on Jan. 25, 2002, entitled "Programmable Output, Load Dependent, Variable Bandwidth, Dual Mode Hysteretic Switch Mode Controller Functional Description," which is incorporated herein by reference.

BACKGROUND OF THE INVENTION

1. Field of the Invention

The present invention relates to power controllers, and more particularly to digitally controlled hysteretic dual mode power controllers, such as those used to power Subscriber Line Interface Circuits.

2. Related Art

Typical switch mode controllers use fixed frequency pulse width modulated (PWM) techniques for low power applications, such as flyback converters. These converters take an error signal generated from comparing a scaled output voltage to a reference voltage and amplify and filter the error signal.

This analog error signal is then compared to a current ramp for the primary inductor (in current mode controlled topologies) to modulate the primary inductor pulse width. This allows the output voltage error to program the primary inductor current and thus delivered power. This technique has shortcomings, such as control loop gain and bandwidth as a function of loading. At light loads, where these converters begin pulse skipping, stability problems arise. Compensating these converters for a wide dynamic range of power output becomes difficult. In addition, firing the primary switch every cycle at high frequencies dissipates excessive power relative to the light load condition, thus making the converter very inefficient at light loads. Therefore, light load converter stability and efficiency are two significant shortcomings of this approach.

An example of an application of such analog power controllers is in telephony, such as power controllers used to power subscriber line interface circuits (SLICs). The particular efficiency problem arises due to the difficulty of achieving good efficiency at all modes of operation over a wide range of load conditions. Specifically, while the power controllers (power converters) are relatively efficient in the off-hook state, they are typically very inefficient in the idle (on-hook) state. In typical household configurations, at nearly zero efficiency, under typical on-hook operating conditions, the power supply is wasting approximately 150–200 milliwatts.

Further, the SLIC needs to be able to operate during a lost power condition, i.e. it needs to operate from a battery power source. Under these conditions, the power controller's efficiency in the idle state becomes particularly important.

Accordingly, a need exists for a power output controller that is efficient at various load conditions, such as the on-hook and off-hook conditions in a telephone system, and has well-defined frequencies of operation.

SUMMARY OF THE INVENTION

The present invention is directed to a programmable dual mode hysteretic power output controller that substantially obviates the problems and disadvantages in the related art.

One advantage of the present invention is being able to provide a power output controller that is efficient under a number of different load conditions.

Another advantage of the present invention is being able to provide a power output controller that includes a pulse generator whose frequency is controlled based on current load conditions, yet is predetermined so as to minimize interference with system operations.

Another advantage of the present invention is being able to program the behavior of the pulse generator that charges an output stage of the power output controller under varying load condition.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, there is provided a power output controller including an output stage, a sensing circuit that compares an output voltage of the output stage with a reference voltage, and a digital controller that controls output pulses that charge the output stage with a frequency that is dependent on an output of the comparator.

In another aspect of the present invention there is provided a power controller including an output stage, a sensing circuit that senses a voltage of the output stage, a pulse generator for changing the output stage, and a multi-state logic circuit having N states $S_1$ through $S_N$ corresponding to N pulse frequencies $f_i$ (i=1 through N) and that controls the pulse generator, the pulse frequencies $f_i$ monotonically increasing, wherein the N states include M states $S_1$ through $S_M$ with lower frequencies $f_1$ through $f_M$ and states $S_{M+1}$ through $S_N$ with higher frequencies $f_{M+1}$ through $f_N$, wherein the logic circuit switches to state $S_N$ from any of states $S_1$ through $S_M$ when a number of pulses needed to charge the output stage exceeds a threshold number $N_{Ai}$ for each state $S_1$ through $S_M$.

In another aspect of the present invention there is provided a power controller including an output stage, a sensing circuit that senses a voltage of the output stage, a pulse generator for changing the voltage of the output stage, and a logic circuit having N states $S_1$ through $S_N$ corresponding to N pulse frequencies $f_i$ (i=1 through N) and that controls pulse generator, the pulse frequencies $f_i$ monotonically increasing, wherein the N states include M states $S_1$ through $S_M$ with lower frequencies $f_1$ through $f_M$ and states $S_{M+1}$ through $S_N$ with higher frequencies $f_{M+1}$ through $f_N$, wherein the logic circuit switches to state $S_N$ from any of states $S_1$ through $S_M$ when a number of pulses needed to charge the output stage exceeds a threshold number $N_{Ai}$ for each state $S_1$ through $S_M$, wherein the logic circuit switches to a next higher state from any of states $S_{M+1}$ through $S_{N-1}$ when a number of pulses needed to charge the output stage exceeds $N_{Ai}$ for each state $S_{M+1}$ through $S_{N-1}$, and wherein the logic circuit switches to a next lower state when the number of pulses needed to charge the output stage is less than a threshold number $N_{Bi}$ for each state $S_2$ through $S_N$.

In another aspect of the present invention there is provided a power output controller including an output stage, a sensing circuit that senses an output voltage of an output stage, a frequency modulated pulse generator for charging the output stage, and a multi-state digital controller that controls a frequency of pulses generated by the pulse generator based on output of the sensing circuit.

In another aspect of the present invention there is provided a method of controlling power output comprising the steps of sensing a voltage of an output stage, for charging the output stage by driving a pulse generator; and controlling the pulse generator by using a multi-state logic circuit having N states $S_1$ through $S_N$ corresponding to N pulse frequencies $f_i$ (i=1 through N), the pulse frequencies $f_i$ monotonically increasing, wherein the N states include M states $S_1$ through $S_M$ with lower frequencies $f_1$ through $f_M$ and states $S_{M+1}$ through $S_N$ with higher frequencies $f_{M+1}$ through $f_N$, wherein the logic circuit switches to state $S_N$ from any of states $S_1$ through $S_M$ when a number of pulses needed to charge the output stage exceeds a threshold number $N_{Ai}$ for each state $S_1$ through $S_M$.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to the preferred embodiments of the present invention, examples of which are illustrated in the accompanying drawings.

In one embodiment of the present invention, an ultra-efficient switch mode controller topology uses variable, load dependent bandwidth adjustment to achieve ultra-low idle power objectives in battery operated systems, such as network powered cable communication services equipment and SLICs. This provides high efficiency power conversion from no load to full load, as opposed to fixed frequency (pulse width modulated, or PWM) designs that dramatically reduce efficiency at light loads. In addition, low cost is also achieved with the elimination of costly external controllers.

Figure 1:
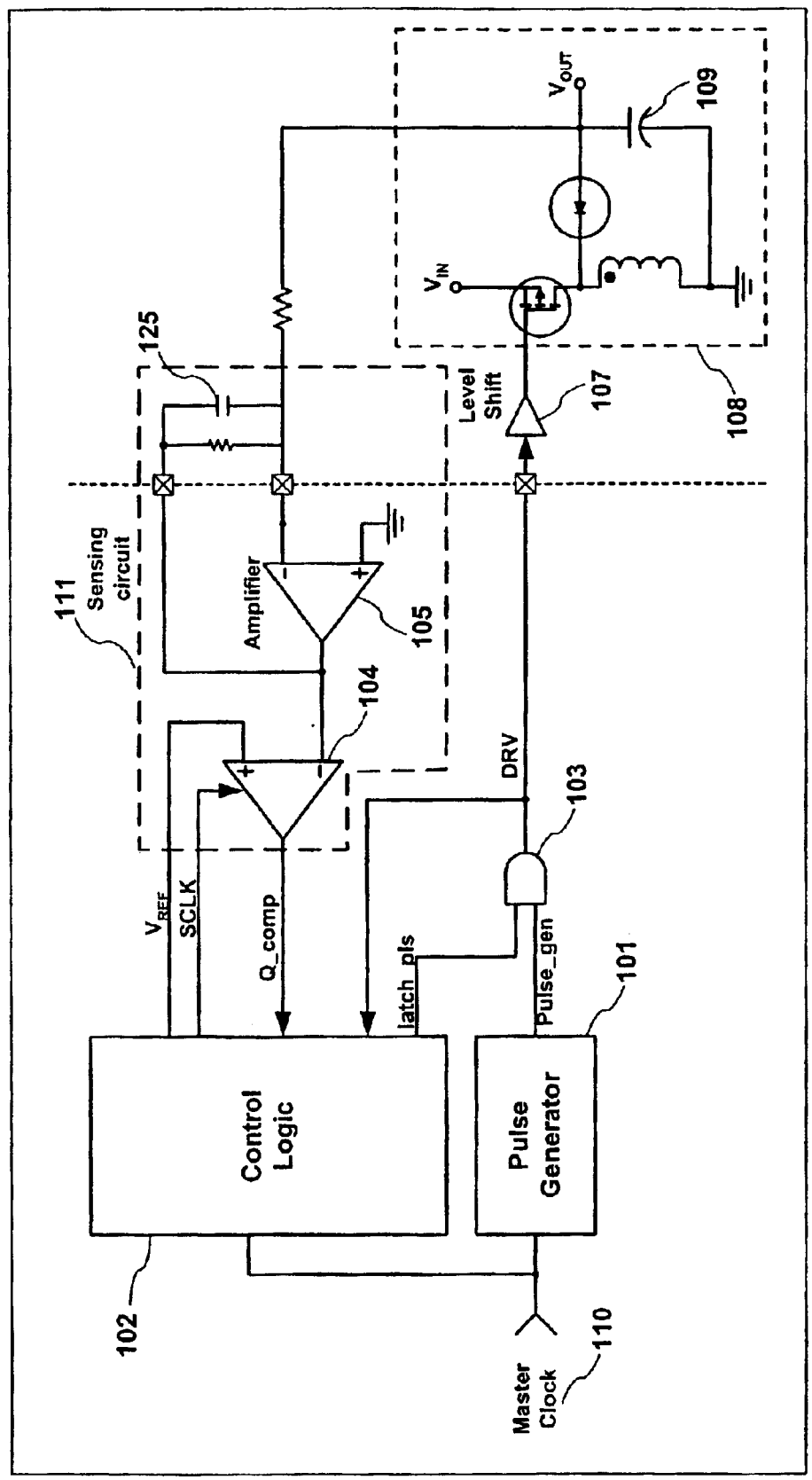
FIG. 1 is a schematic illustration of one embodiment of the present invention.
Figure 5:
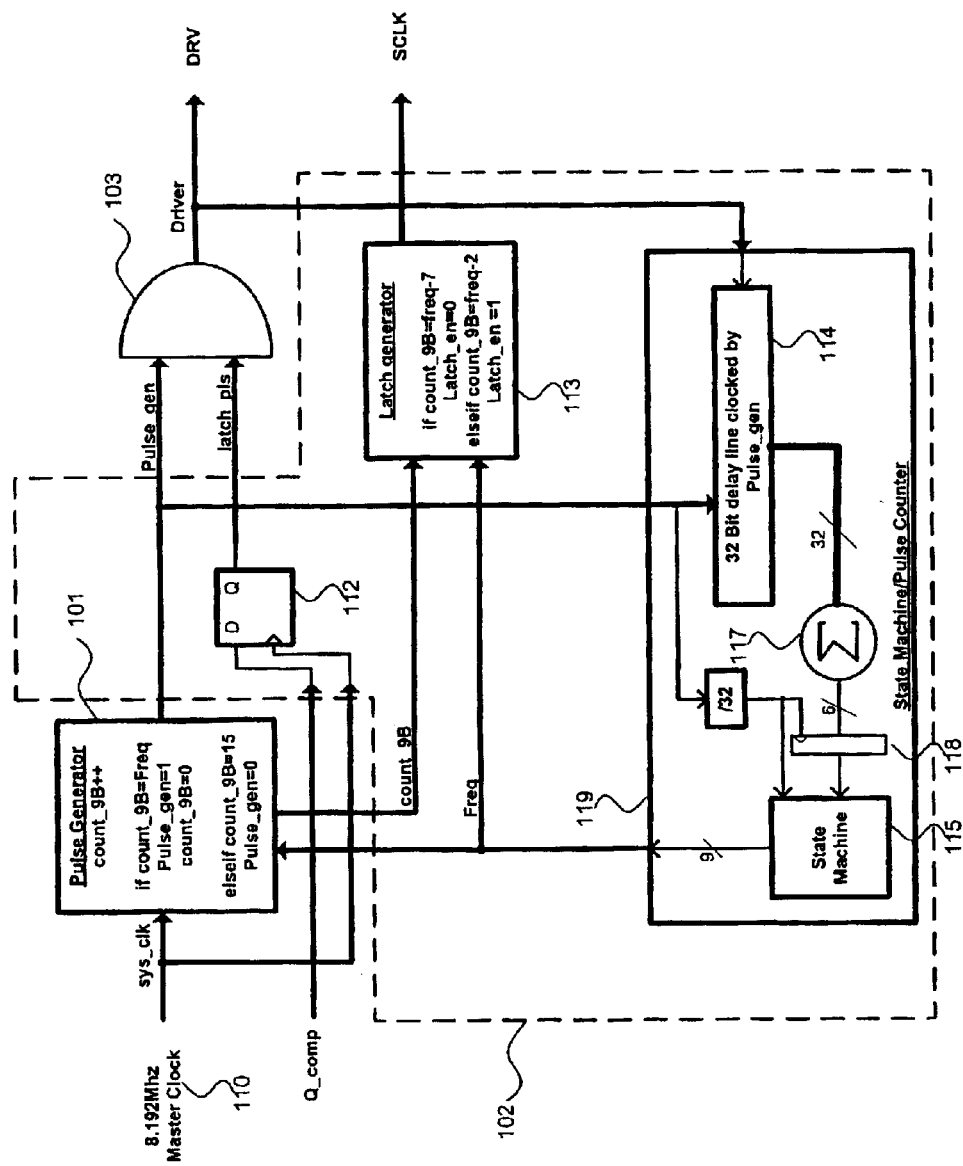
FIG. 5 is a block diagram showing additional detail of the control logic block of FIG. 1.

The diagrams of FIGS. 1 and 5 illustrate the basic block diagram of the hysteretic controller of one embodiment of the present invention. This embodiment uses an inverted boost topology, as might be required in a cable telephony application where a positive supply voltage, such as +12 V, is converted to a negative battery supply, such as –48 V.

As may be seen in FIGS. 1 and 5, the power controller of one embodiment of the present invention includes a pulse generator 101 and a control logic block 102, both of which have a master clock 110 as an input. The pulse generator 101 outputs pulses that charge a capacitor 109 of an output stage 108 through an AND gate 103 and a level shifter 107.

A sensing circuit 111 that includes an op amp 105 and a comparator 104 is used to sense a charging state of the capacitor 109. A scaled version of the output voltage $V_{OUT}$ which is outputted by an op amp 105, is compared to a programmable reference signal $V_{REF}$ by the comparator 104. A fixed pulse width (for example, 2 μsec) variable frequency method is used. The control logic 102 uses an output of the sensing circuit Q_comp to count a number of output pulses ($N_P$) that occurred in a sliding time window that would allow, for example, 32 contiguous pulses at the particular switching frequency $f_i$. Note that the output voltage $V_{OUT}$ is preferably pre-filtered by the capacitor 125 to band limit the noise that the comparator 104 sees to avoid erroneous operation. As noted above the op amp 105 is used to generate a scaled down voltage proportional to the voltage $V_{OUT}$ on the capacitor 109. The scaled down voltage is fed into the inverting (–) input of the comparator 104.

The programmable voltage reference $V_{REF}$ is provided by the control block 102 that allows the output voltage $V_{OUT}$ to vary depending on the desired state, for example –24 V for telephony off-hook states, –48 V for on-hook states and –75 V for ringing states. The reference voltage $V_{REF}$, which is outputted by the control logic 102, is fed into the non-inverting (+) input of the comparator 104. If the comparator 104 decides the magnitude of the output needs to increase, it will signal the control logic block 102 accordingly.

The output Q_comp of the comparator 104 and the master clock 110 are inputted into the control logic 102, as further discussed below with reference to FIG. 5.

FIG. 5. further illustrates the relationship between elements of the control block 102 and the pulse generator 101. As shown in FIG. 5, the Q_comp signal from the comparator 104 is inputted into a DQ flip-flop 112 (a latch pulse). The master clock 110 (8.192 MHz in the preferred embodiment), is inputted into the pulse generator 101 and the clock input of the DQ flip-flop 112 as sys_clk. The pulse generator 101 outputs the Pulse_gen signal to the AND gate 103. The DQ flip-flop 112 outputs the latch_pls signal to the AND gate 103 as well. The Pulse_gen and latch_pls signals are ANDed by the AND gate 103, outputting the driver (DRV) signal. The DRV signal is inputted into the level shifter 107, as well as into a state machine/pulse counter 119 of the control block 102.

The state machine/pulse counter 119 includes a 32 bit delay line 114, which uses the DRV signal and the Pulse_gen signal outputted by the pulse generator 101 as inputs. In the case of a window of pulses corresponding to 32 cycles of the Pulse_gen signal, the delay line 114 is essentially used to count how many times during the window the driver 103 was on. The 32 bit delay line 114, which is clocked by the Pulse_gen signal, outputs its output into a summer 117. The summer 117 therefore outputs the number of pulses $N_P$ outputted by the driver 103 during a particular time window. The Pulse_gen signal also is inputted into a divide by 32 block 116. The summer 117 and the divide by 32 block 116 output their signals into a latch 118. The output of the latch 118 and the divide by 32 block 116 go into a state machine 115, which operates once every 32 cycles. The operation is described in additional detail below with reference to FIG. 2.

The state machine 115 outputs a Freq signal (indicating at what frequency the pulse generator 101 should run) to the pulse generator 101 and to a latch generator 113. The pulse generator 101 also outputs a count_9B signal to the latch generator 113, and the latch generator 113 outputs an SCLK signal to the comparator 104, to enable the comparator 104.

Figure 6:
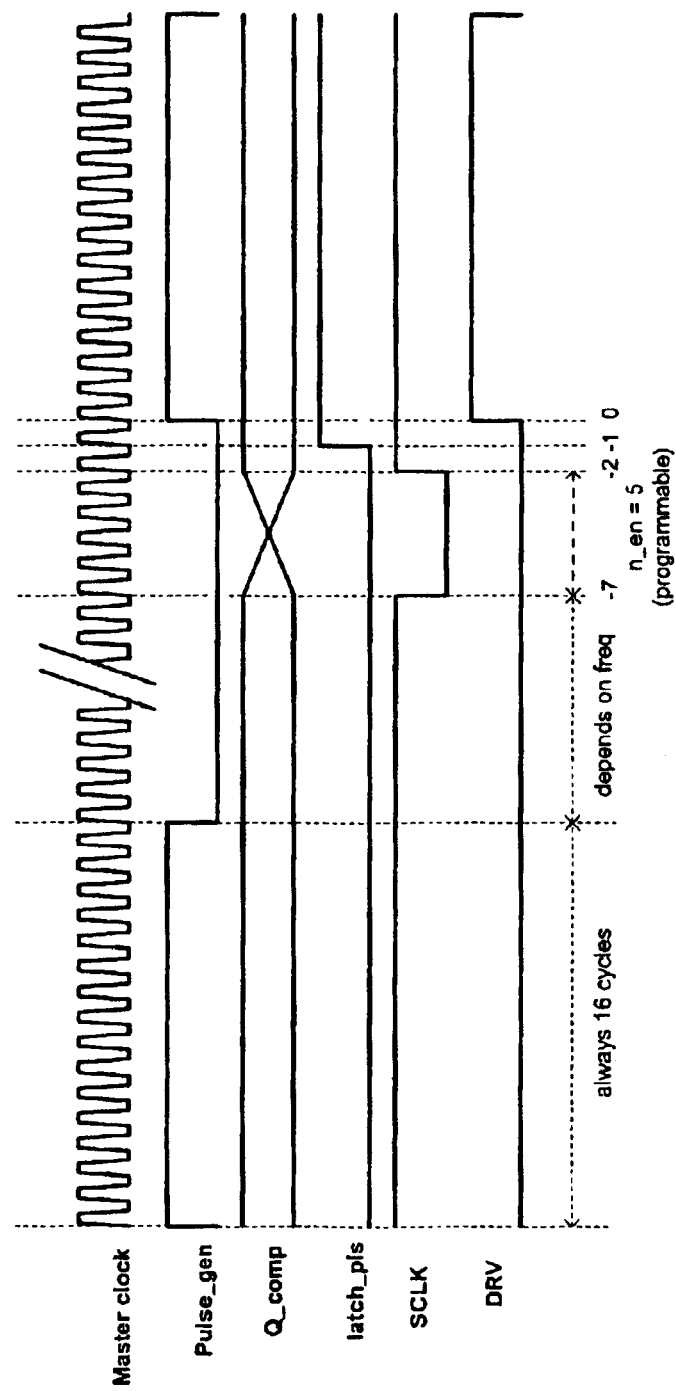
FIG. 6 is a timing diagram of the control logic block of FIG. 5.

FIG. 6 illustrates a timing diagram of the control logic block 102 and the pulse generator 101 that are illustrated in FIGS. 1 and 5. As shown in FIG. 6, the pulse generator 101 (i.e., the Pulse_gen signal) stays on for 16 cycles of the master clock 110, but stays off for a period of time determined by the control block 102, thus enabling a fixed pulse width, with frequency modulation of the charging process of the capacitor 109.

The comparator 104 outputs the Q_comp signal when the SCLK output of the latch generator 113 goes low. After the SCLK signal returns to high, the latch_pls signal goes high, and the output DRV of the AND gate 103 goes high, charging the capacitor 109.

Figure 2:
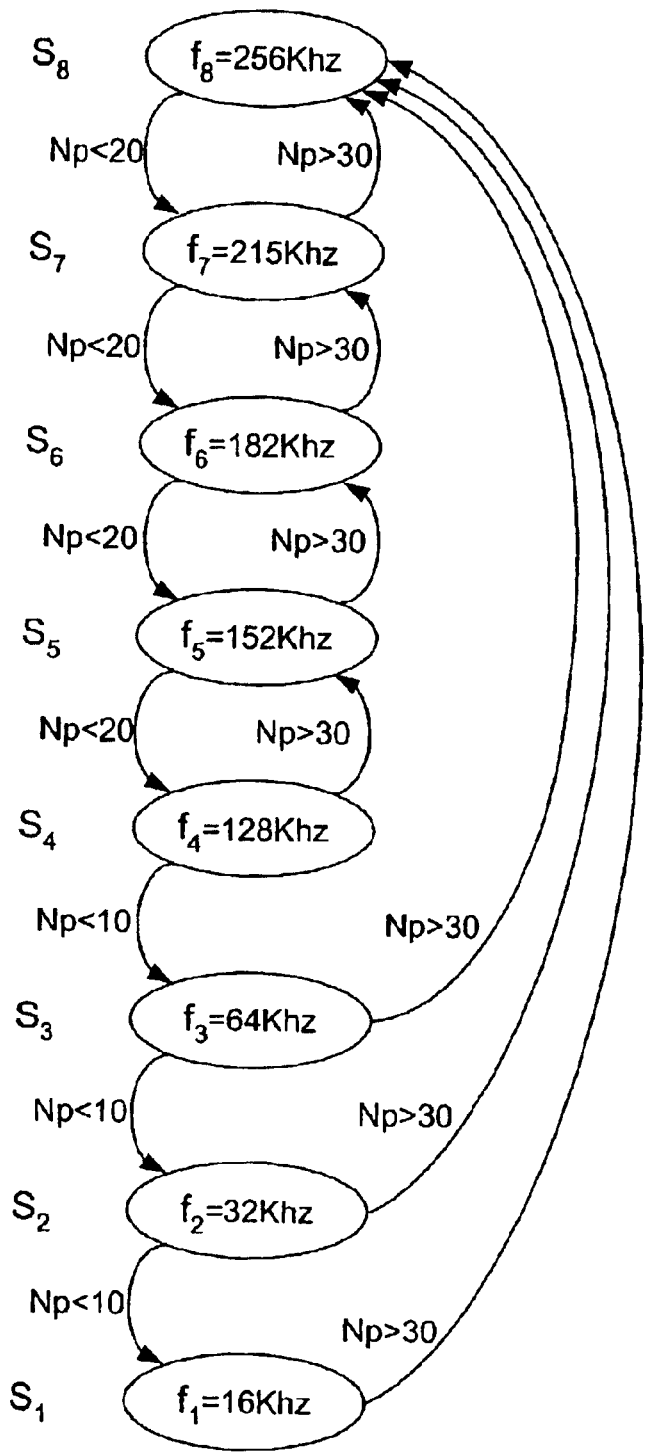
FIG. 2 illustrates a state diagram of the control logic block of FIG. 1.

The operation of the power controller of the embodiment shown in FIG. 1 is further illustrated by the state diagram of FIG. 2. FIG. 2 shows that the control logic block 102 has a number of states $S_i$ (i.e, i=1 through N, or $S_1$ through $S_8$ in this example). Each state corresponds to a different frequency $f_i$ at which the pulse generator 101 outputs the pulses that charge up the capacitor 109. In the preferred embodiment, the frequencies $f_i$ are monotonically increasing with i. As described above, through the use of the sensing circuit 111 formed by the op amp 105 and the comparator 104, the control logic block 102 monitors charge on the capacitor 109. Under heavy load condition, the capacitor 109 discharges rapidly, requiring a large number of pulses $N_P$ in a given time window to recharge. Thus, if the control logic block is in a state $S_1$ (i.e., the most quiescent or idle state), the pulse generator 101 only needs to output pulses at a rate of 16 KHz. If the control logic block 102 senses that in a given time window, the number of pulses $N_P$ required to charge the capacitor 109 is greater than a certain threshold (for example, 30 out of a maximum of 32), the frequency $f_i$ at which the pulse generator 101 charges the output stage will shift to 256 KHz (i.e., state $S_8$). A similar situation occurs if the control logic block 102 is in state $S_2$ or $S_3$, which correspond to the pulse generator 101 frequencies of 32 KHz and 64 KHz, respectively. It will be appreciated that the frequencies $f_i$ are typically chosen to avoid a multiple or a submultiple of a frequency where there is some particular noise concern, so as to minimize interference with system operation.

If the control logic block 102 is in states $S_4$, $S_5$, $S_6$, or $S_7$, and the number of pulses $N_P$ in a given time window is greater than a predetermined threshold $N_{Ai}$, in this case 30 (for i=2 through 7), then the control logic block 102 will shift to the next higher state (from state i to state i+1), e.g., from $S_5$ to $S_6$, or from $S_7$ to $S_8$. If the control logic block 102 recognizes that the number of pulses needed to keep the capacitor 109 charged is less than a predetermined threshold $N_{Bi}$, of a given state i, the control logic block 102 will shift to the next lower state, from $S_i$ to $S_{i-1}$.

More generally, the operation of the state machine represented by the control logic block 102 may be thought of as follows: a number of possible states $S_1$ through $S_N$ exists in the state machine. The states may be thought of as M lower states $S_1$ through $S_M$ and N–M higher states, i.e., $S_{M+1}$ though $S_N$. For each state i, there is a corresponding frequency $f_i$ ($f_1$ though $f_N$). For each state i, there is a number of pulses $N_{Ai}$ which represent a threshold that triggers a shift to a higher state i+1. For each state $S_2$ through $S_N$ there is also a threshold $N_{Bi}$ where the state of the control logic block 102 would change down to a lower state i–1 if the number of pulses $N_P$ required to maintain a charge in the capacitor 109 is less than the threshold $N_{Bi}$.

Thus, if the number of pulses is greater than the maximum threshold $N_{Ai}$ for that particular frequency $f_i$, then the frequency is raised to the next higher frequency. If the number of pulses is less than the minimum threshold $N_{Bi}$ for that particular frequency $f_i$, then the frequency $f_i$ is lowered to the next lower frequency $f_{i-1}$, as illustrated in FIG. 2. This provides switching frequency hysteresis. In order to maintain high efficiency during low output power conditions and good dynamic load regulation, the lower switching frequencies advance to the highest switching frequencies when more output power is required.

It is worth noting that although in the particular embodiment illustrated in FIGS. 1 and 2, the $N_{Ai}$, for all of the states $S_1 \ldots S_{N-1}$ is the same (i.e., 30), this need not be the case. Additionally, it will be understood by one of ordinary skill in the art that just as $N_{Ai}$ may be different for each state, $N_{Bi}$ may also be different for each state. The digital controller includes a counter that monitors how many pulses have been output in the last $N_T$ (32 in one embodiment) Pulse_gen periods, continually updated on a sliding pulse-by-pulse scale.

It will also be understood by one of ordinary skill in the art that the use of the op amp 105 in this circuit is not always necessary for the invention to function.

Although the frequencies $f_i$ shown in the state diagram of FIG. 2 are believed to be optimum for the particular telephony (SLIC) application described above, it will be readily appreciated by one of ordinary skill in the art that these frequencies $f_i$ may be selected in accordance with a particular application, operating conditions and load ranges, and may vary on a case by case basis. It will also be appreciated that the number of states $S_i$ is not limited to that shown in FIG. 2.

Note that components to the left of the dotted line in FIG. 1 represent circuitry that can be readily integrated in a low voltage CMOS process.

The digital feedback loop provides control of the power converter over a wide range of switching frequencies as opposed to an analog feedback and control loop with fixed frequency operation. Moving the switching frequency to very low frequencies (constant on-time pulse width) provides very efficient power conversion at virtually no load, since the majority of losses are due to switching losses at low power. With multiple switching frequencies available, efficiency can be optimized for all load conditions, from no load to full load.

In another embodiment, a master clock 110 of 12.288 Mhz may be used, with only six states, $S_1$ through $S_6$. The states $S_1$–$S_6$ correspond to frequencies of $f_6$=384 Khz
$f_5$=285 Khz
$f_4$=192 Khz
$f_3$=96 Khz
$f_2$=48 Khz
$f_1$=24 Khz This embodiment could have greater performace depending on the overall system requirements.

It will be appreciated that the pulse generator 101 may be constructed in any number of ways, as long as it generates the pulses that drive the circuit that provides current to the capacitor 109. For example, it may be a separate generator, or implemented as part of the same IC as the control block 102.

Figure 3:
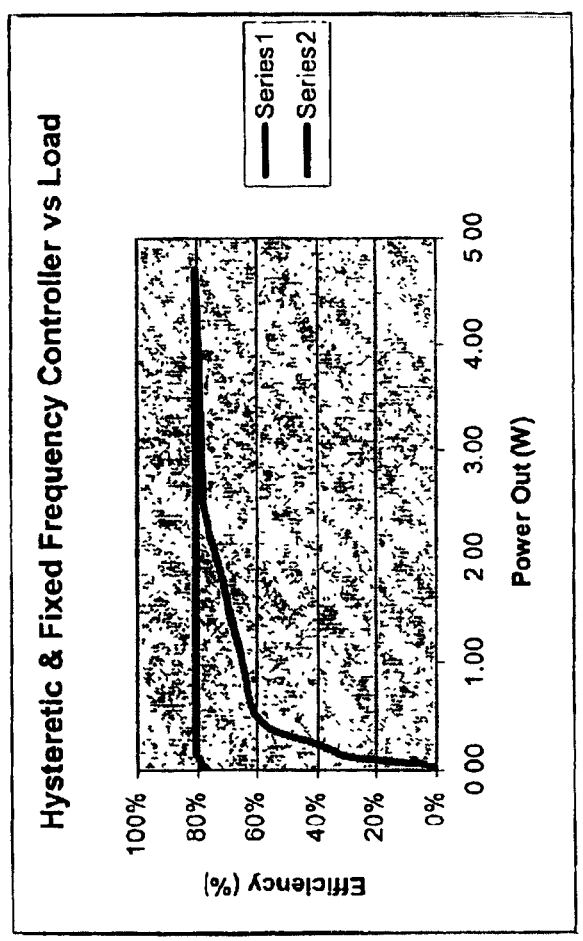
FIG. 3 is a comparison of a conventional pulse width modulation power output controller and a power output controller of the present invention as described in the embodiment of FIG. 1.
Figure 4:
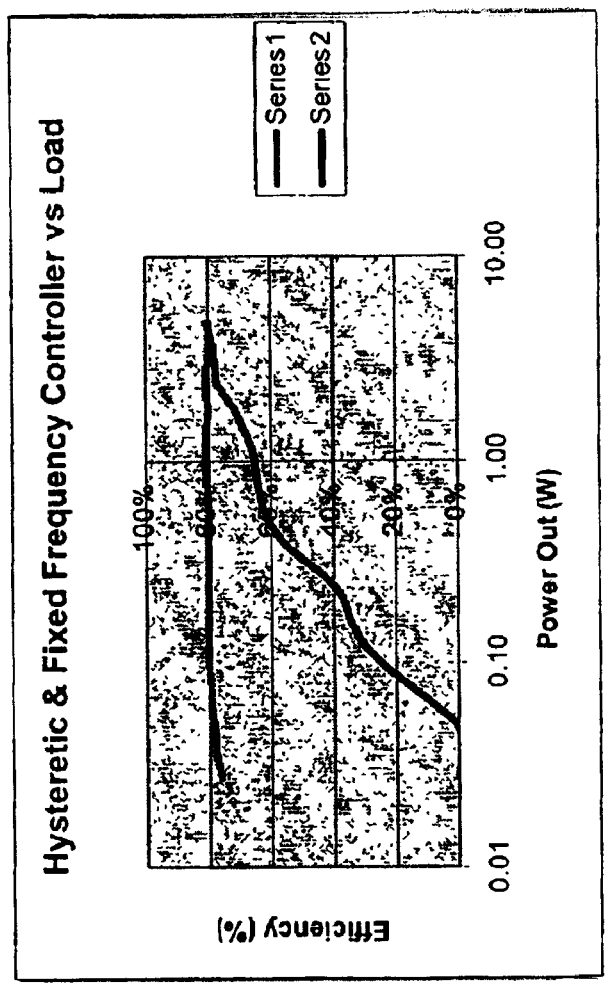
FIG. 4 is a representation of FIG. 3 with the scale of the x-axis shown as logarithmic.

FIGS. 3 and 4 show the improvement in efficiency resulting from the use of the present invention. Both figures represent the same data, but FIG. 4 has a logarithmic scale on the x-axis, which allows a better illustration of the efficiency at lower loads (e.g., the idle state). The lower curve in FIGS. 3 and 4 represents the related art efficiency, while the upper curve shows the efficiencies achieved with the power output controller of the present invention.

With a dual mode hysteretic controller such as described above, comparator and switching frequency hysteresis, output noise can be spread over a wider frequency band, thus allowing lower noise power densities at particular frequencies. The converter control topology described here eliminates stability problems by providing a method that does not require analog compensation, thus eliminating the analog compensation issue. By providing variable switching frequencies that minimize light load power dissipation, the efficiency curve is flattened from no load to full load as illustrated in FIGS. 3 and 4.

This topology and control method can reduce system costs by easily allowing integration of the controller and elimination of variable compensation components required for different applications.

The verilog code below illustrates one particular embodiment of the present invention, such as that shown in FIGS. 1 and 5. It will be understood that this embodiment is merely illustrative, and that the invention is not limited to this particular implementation.

Pulse Generator—
// This circuit generates pulse_gen. It runs at the sys_clk rate and consists of a 9 bit up counter called count_9B that
// is reset to zero when the counter reaches the value of freq. Pulse_gen is always high for 16 cycles of sys_clk// while count_9B goes from 0 to 15 and is then low until count_9B=freq. This allows a frequency range of "//pulse_gen to be 16 kHz (sys_clk/512) to 256 kHz (sys_clk/32) in the present embodiment".

```
//Generate Pulse
    always @(posedge sys_clk or negedge reset_n)
        if(!reset_n)
            begin
                pulse_gen <= 1'b0;
                count_9b <= 9'h000;
            end
        else
            begin
                if(count_9b==freq)
                    begin
                        pulse_gen <= 1'b1;
                        count_9b <= 9'h000;
                    end
                else
                    if(count_9b==9'h00f)
                        begin
                            pulse_gen <= 1'b0;
                            count_9b <= count_9b + 9'h001;
                        end
                    else
                        count_9b <= count_9b + 9'h001;
            end
```

Latch Pulse
//
//The ouput of the comparator is latched into the signal latch_pls at the rising edge of sys_clk

```
// Latch q_comp into latch_pls
    always @(posedge sys_clk or negedge reset_n)
        if(!reset_n)
            latch_pls <= 1'b1;
        else
            latch_pls <= q_comp;
```

And Gate
// The pulse_gen signal is anded with the latched version of the comparator output Q_comp to make the signal driver.
    always@(posedge pulse_gen )
    assign driver=pulse_gen & latch_pls;

Latch Generator
//
// The latch_en signal allows the comparator to operate. This signal is low for 5 clock cycles and goes low 7 cycles
//before the rising edge of pulse_gen, then goes high 2 cycles before the rising edge of pulse_gen.

```
// make latchen_2 low for 5 cycles before rising edge of pulse
    always @(posedge sys_clk or negedge reset_n)
        if(!reset_n)
            latch_en <= 1'b1;
        else
            begin
                if(count_9b==freq-9'd7)
                    latch_en <= 1'b0;
                if(count_9b==freq-9'd2)
                    latch_en <= 1'b1;
            end
    assign latchen = latch_en;
```

State Machine/Pulse Counter
//Pulse counter
// This circuit counts the number of pulses that occurs on the signal, driver during a period of 32 occurences of //pulse_gen. The 32 bit delay line is clockedkby the rising edge of pulse_gen.

```
always @(posedge sys_clk or negedge reset_n)
    if(!reset_n)
        begin
            freq <= 9'h1ff;
            delay <= 6'd31;
            clk_del <= 1'b0;
            pd32 <= 6'b0; pd31 <= 6'b0; pd30 <= 6'b0; pd29 <= 6'b0;
            pd28 <= 6'b0; pd27 <= 6'b0; pd26 <= 6'b0; pd25 <= 6'b0;
            pd24 <= 6'b0; pd23 <= 6'b0; pd22 <= 6'b0; pd21 <= 6'b0;
            pd20 <= 6'b0; pd19 <= 6'b0; pd18 <= 6'b0; pd17 <= 6'b0;
            pd16 <= 6'b0; pd15 <= 6'b0; pd14 <= 6'b0; pd13 <= 6'b0;
            pd12 <= 6'b0; pd11 <= 6'b0; pd10 <= 6'b0; pd9 <= 6'b0;
            pd8 <= 6'b0; pd7 <= 6'b0; pd6 <= 6'b0; pd5 <= 6'b0;
            pd4 <= 6'b0; pd3 <= 6b0; pd2 <= 6'b0; pd1 <= 6'b0;
        end
    else
        begin
            clk_del <= pulse_gen;
            if(pulse_gen & ~clk_del)
                begin
```

```
                // if time for a pulse, put state of driver in delay line
                pd32 <= pd31; pd31 <= pd30; pd30 <= pd29; pd29 <= pd28;
                pd28 <= pd27; pd27 <= pd26; pd26 <= pd25; pd25 <= pd24;
                pd24 <= pd23; pd23 <= pd22; pd22 <= pd21; pd21 <= pd20;
                pd20 <= pd19; pd19 <= pd18; pd18 <= pd17; pd17 <= pd16;
                pd16 <= pd15; pd15 <= pd14; pd14 <= pd13; pd13 <= pd12;
                pd12 <= pd11; pd11 <= pd10; pd10 <= pd9; pd9 <= pd8;
                    d8 <= pd7; pd7 <= pd6; pd6 <= pd5; pd5 <= pd4;
                    d4 <= pd3; pd3 <= pd2; pd2 <= pd1; pd1 <= {5'b0,driver_2};
    pulse_count=pd1+pd2+pd3+pd4+pd5+pd6+pd7+pd8
                    +pd9+pd10+pd11+pd12+pd13+pd14+pd15+pd16
                        +pd17+pd18+pd19+pd20+pd21+pd22+pd23+pd24
                            +pd25+pd26+pd27+pd28+pd29+pd30+pd31+pd32;
```

//State Machine
// This circuit controls the value of freq by looking at the accumulated pulse_count every 32 occurences of //pulse_gen. If the value is below the low threshold for that state, freq goes to the next lower freq state. If the value //is above the high threshold for that state, freq goes to the next higher freq state. Note that at 16,32 and 64 khz, if //the high theshold is crossed then the next state is the higher value of freq, 256 khz. This allows the circuit to //quickly react to a high power requirement.
//

```
// case statement for looking at 32 pulse gen window
    if(delay==6'd0)
        begin
            case(freq)
            9'h1ff: //16Khz
                begin
                    if(pulse_count > 6'h1e)
                        begin
                            freq <= 9'h01f;
                            delay <= 6'd31;
                        end
                end
            9'h0ff: //32Khz
                begin
                    if(pulse_count < 6'ha)
                        begin
                            freq <= 9'h1ff;
                            delay <= 6'd31;
                        end
                    if(pulse_count > 6'h1e)
                        begin
                            freq <= 9'h01f;
                            delay <= 6'd31;
                        end
                end
            9'h07f: //64khz
                begin
                    if(pulse_count < 6'ha)
                        begin
                            freq <= 9'h0ff;
                            delay <= 6'd31;
                        end
                    if(pulse_count > 6'h1e)
                        begin
                            freq <= 9'h01f;
                            delay <= 6'd31;
                        end
                end
            9'h03f: //128khz
                begin
                    if(pulse_count < 6'ha)
                        begin
                            freq <= 9'h07f;
                            delay <= 6'd31;
                        end
                    if(pulse_count > 6'h1e)
                        begin
                            freq <= 9'h035;
                            delay <= 6'd31;
                        end
                end
            9'h035: //152khz
                begin
                    if(pulse_count < 6'h14)
                        begin
                            freq <= 9'h03f;
                            delay <= 6'd31;
                        end
                    if(pulse_count > 6'h1e)
                        begin
                            freq <= 9'h02c;
                            delay <= 6'd31;
                        end
                end
            9'h02c: //182khz
                begin
                    if(pulse_count < 6'h14)
                        begin
                            freq <= 9'h035;
                            delay <= 6'd31;
                        end
                    if(pulse_count > 6'h1e)
                        begin
                            freq <= 9'h025;
                            delay <= 6'd31;
                        end
                end
            9'h025: //215khz
                begin
                    if(pulse_count < 6'h14)
                        begin
                            freq <= 9'h02c;
                            delay <= 6'd31;
                        end
                    if(pulse_count > 6'h1e)
                        begin
                            freq <= 9'h01f;
                            delay <= 6'd31;
                        end
                end
            9'h01f: //256khz
                begin
                    if(pulse_count < 6'h14)
                        begin
                            freq <= 9'h025;
                            delay <= 6'd31;
                        end
                end
            endcase
        end
    else
        delay <= delay-1;
```

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

What is claimed is:

1. A power output controller comprising:
   an output stage;
   a sensing circuit for providing an output representative of an output voltage of the output stage; and
   a digital controller that controls output pulses that charge the output stage with a frequency that is dependent on the output of the sensing circuit,
   wherein the digital controller includes a logic circuit having N states $S_1$ through $S_N$ corresponding to N pulse frequencies $f_i$ (i=1 through N) and that controls output to the output stage, the pulse frequencies $f_i$ monotonically increasing.

2. The power output controller of claim 1, wherein the output stage includes a capacitor being charged by the output pulses.

3. The power output controller of claim 1, wherein the sensing circuit scales the output voltage prior to inputting the output voltage into a comparator.

4. The power output controller of claim 1, wherein the sensing circuit includes an op amp for scaling the output voltage prior to inputting the output voltage into a comparator.

5. The power output controller of claim 1, further including a pulse generator for generating the output pulses, the pulse generator being controlled by the digital controller.

6. The power output controller of claim 1, wherein the N states include M states $S_1$ through $S_M$ with lower frequencies $f_1$ through $f_M$ and states $S_{M+1}$ through $S_N$ with higher frequencies $f_{M+1}$ through $f_N$,
   wherein the logic circuit switches to state $S_N$ from any of states $S_1$ through $S_M$ when a number of pulses needed to charge the output stage exceeds a threshold number $N_{Ai}$ for each state $S_1$ through $S_N$,
   wherein the logic circuit switches to a next higher state from any of states $S_{M+1}$ through $S_{N-1}$ when the number of pulses needed to charge the output stage exceeds $N_{Ai}$ for each corresponding state $S_{M+1}$ through $S_{N-1}$, and
   wherein the logic circuit switches to a next lower state when the number of pulses needed to charge the output stage is less than a threshold number $N_{Bi}$ for each state $S_2$ through $S_N$.

7. The power controller of claim 6, wherein $N_{Ai} > N_{Bi}$ for each state.

8. The power output controller of claim 1, wherein the frequencies $f_i$ are programmable.

9. A power controller comprising:
   an output stage;
   a sensing circuit for providing an output corresponding to a voltage of the output stage;
   a pulse generator that charges the output stage; and
   a multi-state digital logic circuit having N states $S_1$ through $S_N$ corresponding to N pulse frequencies $f_i$ (i=1 through N) and that controls the pulse generator, the pulse frequencies $f_i$ monotonically increasing,
   wherein the N states include states $S_1$ through $S_M$ with lower frequencies $f_1$ through $f_M$ and states $S_{M+1}$ through $S_N$ with higher frequencies $f_{M+1}$ through $f_N$, and
   wherein the logic circuit switches to state $S_N$ from any of states $S_1$ through $S_M$ when a number of pulses needed to charge the output stage exceeds a threshold number $N_{Ai}$ for each state $S_1$ through $S_M$.

10. The power controller of claim 9, wherein the multi-state digital logic circuit switches to a next higher state from any of states $S_{M+1}$ through $S_{N-1}$ when the number of pulses needed to charge the output stage exceeds $N_{Ai}$ for each state $S_{M+1}$ through $S_{N-1}$.

11. The power controller of claim 9, wherein the multi-state digital logic circuit switches to a next lower state when the number of pulses needed to charge the output stage is less than a threshold number $N_{Bi}$ for each state $S_2$ through $S_N$.

12. The power controller of claim 11, wherein $N_{Ai} > N_{Bi}$ for each state.

13. The power controller of claim 9, wherein the frequencies $f_i$ are programmable.

14. The power output controller of claim 9, wherein the sensing circuit scales the output voltage prior to inputting the output voltage into a comparator.

15. The power output controller of claim 14, wherein the sensing circuit includes an op amp for scaling the output voltage prior to inputting the output voltage into the comparator.

16. The power controller of claim 9, wherein the sensing circuit includes a comparator that compares the voltage of the output stage with a reference voltage.

17. The power controller of claim 16, wherein the reference voltage is outputted by the multi-state digital logic circuit.

18. The power controller of claim 9, wherein the output stage includes a capacitor being charged by the output pulses.

19. A power controller comprising:
   a sensing circuit that provides an output corresponding to a voltage of an output stage;
   a pulse generator that charges the output stage; and
   a digital logic circuit having N states $S_1$ through $S_N$ corresponding to N pulse frequencies $f_i$ (i=1 through N) and that controls the pulse generator based on the output of the sensing circuit, the pulse frequencies $f_i$ monotonically increasing,
   wherein the N states include states $S_1$ through $S_M$ with lower frequencies $f_1$ through $f_M$ and states $S_{M+1}$ through $S_N$ with higher frequencies $f_{M+1}$ through $f_N$,
   wherein the logic circuit switches to state $S_N$ from any of states $S_1$ through $S_M$ when a number of pulses needed to charge the output stage exceeds a threshold number $N_{Ai}$ for each state $S_1$ through $S_M$,
   wherein the logic circuit switches to a next higher state from any of states $S_{M+1}$ through $S_{N-1}$ when a number of pulses needed to charge the output stage exceeds $N_A$ for each state $S_{M+1}$ through $S_{N-1}$, and
   wherein the logic circuit switches to a next lower state when the number of pulses needed to charge the output stage is less than a threshold number $N_{Bi}$ for each state $S_2$ through $S_N$.

20. The power controller of claim 19, wherein $N_{Ai} > N_{Bi}$ for each state.

21. The power controller of claim 19, wherein the sensing circuit includes a comparator that compares the voltage of the output stage with a reference voltage.

22. The power output controller of claim 21, wherein the sensing circuit scales the output voltage prior to inputting the output voltage into the comparator.

23. The power controller of claim 21, wherein the sensing circuit includes an op amp for scaling the output voltage before inputting the output voltage into the comparator.

24. The power controller of claim 19, wherein the frequencies $f_i$ are programmable.

25. The power controller of claim 19, wherein the output stage includes a capacitor being charged by the output pulses.

26. A power output controller comprising:
- a sensing circuit that senses an output voltage of an output stage;
- a frequency modulated pulse generator that charges the output stage; and
- a multi-state digital controller that controls a frequency of pulses generated by the pulse generator based on information from the sensing circuit,
- wherein the multi-state digital controller includes a logic circuit having N states $S_1$ through $S_N$ corresponding to N pulse frequencies $f_i$ (i=1 through N) and that controls output to the output stage, the pulse frequencies $f_i$ monotonically increasing.

27. The power controller of claim 26, wherein the sensing circuit includes a comparator that compares the output voltage with a reference voltage.

28. The power output controller of claim 27, wherein the sensing circuit scales the output voltage prior to inputting the output voltage into a comparator.

29. The power controller of claim 27, wherein the sensing circuit includes an op amp for scaling the output voltage before inputting the output voltage into the comparator.

30. The power output controller of claim 26, wherein the output stage includes a capacitor being charged by the output pulses.

31. The power output controller of claim 26, wherein the multi-state controller includes a logic circuit having N states $S_1$ through $S_N$ corresponding to N pulse frequencies $f_i$ (i=1 through N) and that controls output to the output stage, the pulse frequencies $f_i$ monotonically increasing.

32. The power output controller of claim 31, wherein the N states include M states $S_1$ through $S_M$ with lower frequencies $f_1$ through $f_M$ and states $S_{M+1}$ through $S_N$ with higher frequencies $f_{M+1}$, through $f_N$,
- wherein the logic circuit switches to state $S_N$ from any of states $S_1$ through $S_M$ when a number of pulses needed to charge the output stage exceeds a threshold number $N_{Ai}$ for each corresponding state $S_1$ through $S_M$,
- wherein the logic circuit switches to a next higher state from any of states $S_{M+1}$ through $S_{N-1}$ when a number of pulses needed to charge the output stage exceeds $N_{Ai}$ for each state $S_{M+1}$ through $S_{N-1}$, and
- wherein the logic circuit switches to a next lower state when the number of pulses needed to charge the output stage is less than a threshold number $N_{Bi}$ for each state $S_2$ through $S_N$.

33. The power controller of claim 32, wherein $N_{Ai}>N_{Bi}$ for each state.

34. The power controller of claim 31, wherein the frequencies $f_i$ are programmable.

35. A method of controlling power output comprising the steps of:
- sensing a voltage of an output stage;
- driving a pulse generator to charge the output stage; and
- controlling the pulse generator by using a multi-state digital logic circuit having N states $S_1$ through $S_N$ corresponding to N pulse frequencies $f_i$ (i=1 through N), the pulse frequencies $f_i$ monotonically increasing,
- wherein the N states include M states $S_1$ through $S_M$ with lower frequencies $f_1$ through $f_M$ and states $S_{M+1}$ through $S_N$ with higher frequencies $f_{M+1}$ through $f_N$, and
- wherein the digital logic circuit switches to state $S_N$ from any of states $S_1$ through $S_M$ when a number of pulses needed to charge the output stage exceeds a threshold number $N_{Ai}$ for each state $S_1$ through $S_M$.

36. The method of claim 35, wherein the digital logic circuit switches to a next higher state from any of states $S_{M+1}$ through $S_{N-1}$ when the number of pulses needed to charge the output stage exceeds $N_{Ai}$ for each state $S_{M+1}$ through $S_{N-1}$.

37. The method of claim 36, wherein the digital logic circuit switches to a next lower state when the number of pulses needed to charge the output stage is less than a threshold number $N_{Bi}$ for each state $S_2$ through $S_N$.

38. The method of claim 37, wherein $N_{Ai}>N_{Bi}$ for each state.

39. The method of claim 35, wherein the frequencies $f_i$ are programmable.

40. A power output controller comprising:
- an output stage;
- a sensing circuit for providing an output representative of an output voltage of the output stage; and
- a controller that controls output pulses that charge the output stage with a frequency selected from a plurality of discrete monotonically increasing frequencies and dependent on the output of the sensing circuit.

* * * * *